(12) United States Patent
Burner

(10) Patent No.: US 6,773,219 B2
(45) Date of Patent: Aug. 10, 2004

(54) CONTROL ROD DRIVE HANDLING ASSEMBLY FOR A NUCLEAR REACTOR

(75) Inventor: James E. Burner, Downingtown, PA (US)

(73) Assignee: General Electric Company, Schenectady, NY (US)

( * ) Notice: Subject to any disclaimer, the term of this patent is extended or adjusted under 35 U.S.C. 154(b) by 117 days.

(21) Appl. No.: 09/683,400

(22) Filed: Dec. 21, 2001

(65) Prior Publication Data

US 2003/0118426 A1 Jun. 26, 2003

(51) Int. Cl.$^7$ .............................................. G21C 19/00
(52) U.S. Cl. ..................................... 414/146; 376/260
(58) Field of Search .......................... 414/146; 376/260

(56) References Cited

U.S. PATENT DOCUMENTS

| | | | |
|---|---|---|---|
| 4,292,133 A | * | 9/1981 | Sasaki et al. ................ 376/260 |
| 4,330,369 A | * | 5/1982 | Anderson .................... 376/268 |
| 4,728,484 A | * | 3/1988 | Kodama et al. ............. 376/260 |
| 4,801,422 A | * | 1/1989 | Turner et al. ................ 376/260 |
| 5,030,410 A | | 7/1991 | Perry et al. |
| 5,295,167 A | | 3/1994 | Burner |
| 5,784,426 A | | 7/1998 | Burner et al. |

* cited by examiner

Primary Examiner—Steven A. Bratlie
(74) Attorney, Agent, or Firm—Armstrong Teasdale LLP

(57) ABSTRACT

A positioning apparatus for a CRD handling assembly for a nuclear reactor. The positioning apparatus includes at least one linear slide rail, a drive screw coupled to the at least one slide rail, an elevator movably coupled to the drive screw, and at least one linear bearing attached to the elevator. The linear bearing is slidably coupled to the at least one slide rail.

20 Claims, 7 Drawing Sheets

CONTROL ROD DRIVE HANDLING ASSEMBLY FOR A NUCLEAR REACTOR

BACKGROUND OF THE INVENTION

This invention relates generally to nuclear reactors and more particularly, to a handling assembly for the removal and installation of a control rod drive (CRD) in a nuclear reactor.

A reactor pressure vessel (RPV) of a boiling water reactor (BWR) includes a generally cylindrical shape and is closed at both ends, e.g., by a bottom head and a removable top head. A reactor core is supported within the RPV. A plurality of control rods are positioned in the reactor core and operated from below. Control rods control the excess reactivity in the reactor. Specifically, the reactor core contains control rods that assure safe shutdown and provide the primary mechanism for controlling the reactor. The total number of control rods varies with core size and geometry, and is typically between 50 and 200. The positioning of the control rods, for example, fully inserted, fully withdrawn, or somewhere between, is performed by a plurality of control rod drives (CRDs).

A plurality of openings is formed in the bottom head so that components, such as the CRDs, can extend into the RPV. A control rod drive housing extends through the bottom head opening to facilitate securing the CRD through the RPV. The CRD is coupled to the control rod and facilitates positioning the control rod within the core. The CRD extends from the control rod drive housing into an under vessel area.

On occasions, CRDs are removed for maintenance, repair, or replacement. Each CRD is carefully controlled as it is removed from the control rod drive housing and rotated from a generally vertical position to a generally horizontal position for transport out of the under vessel area. These activities should be performed by a minimum number of personnel and accomplished quickly and efficiently to reduce radiation exposure.

At least some known systems for handling a CRD includes a rigid tower system that allows the CRD to be lowered into a tower supported by a trunnion cart. Once the CRD is removed from the CRD housing, the rigid tower system employs a second winch or hoist which rotates the CRD and tower as a unit from vertical to horizontal. The trunnion cart allows the tower, with the secured CRD, to be rotated. In most cases, the tower with the CRD is then removed from the under vessel area. The CRD is raised and lowered by an elevator secured within the tower. At least some known tower systems include complex systems within the tower to raise and lower the elevator.

SUMMARY OF THE INVENTION

In one aspect, a positioning apparatus is provided for a CRD handling assembly for a nuclear reactor. The positioning apparatus includes at least one linear slide rail, a drive screw coupled to the at least one slide rail, an elevator movably coupled to the drive screw; and at least one linear bearing fixed to the elevator and slidably coupled to the at least one slide rail.

In another aspect, a handling assembly is provided for a CRD for a nuclear reactor. The handling assembly includes a trunnion cart, a tower coupled to the trunnion cart, a drive screw coupled to the tower, an elevator movably coupled to the drive screw, and at least one slide rail coupled to the tower, the at least one slide rail aligning the elevator.

DETAILED DESCRIPTION

Figure 1:
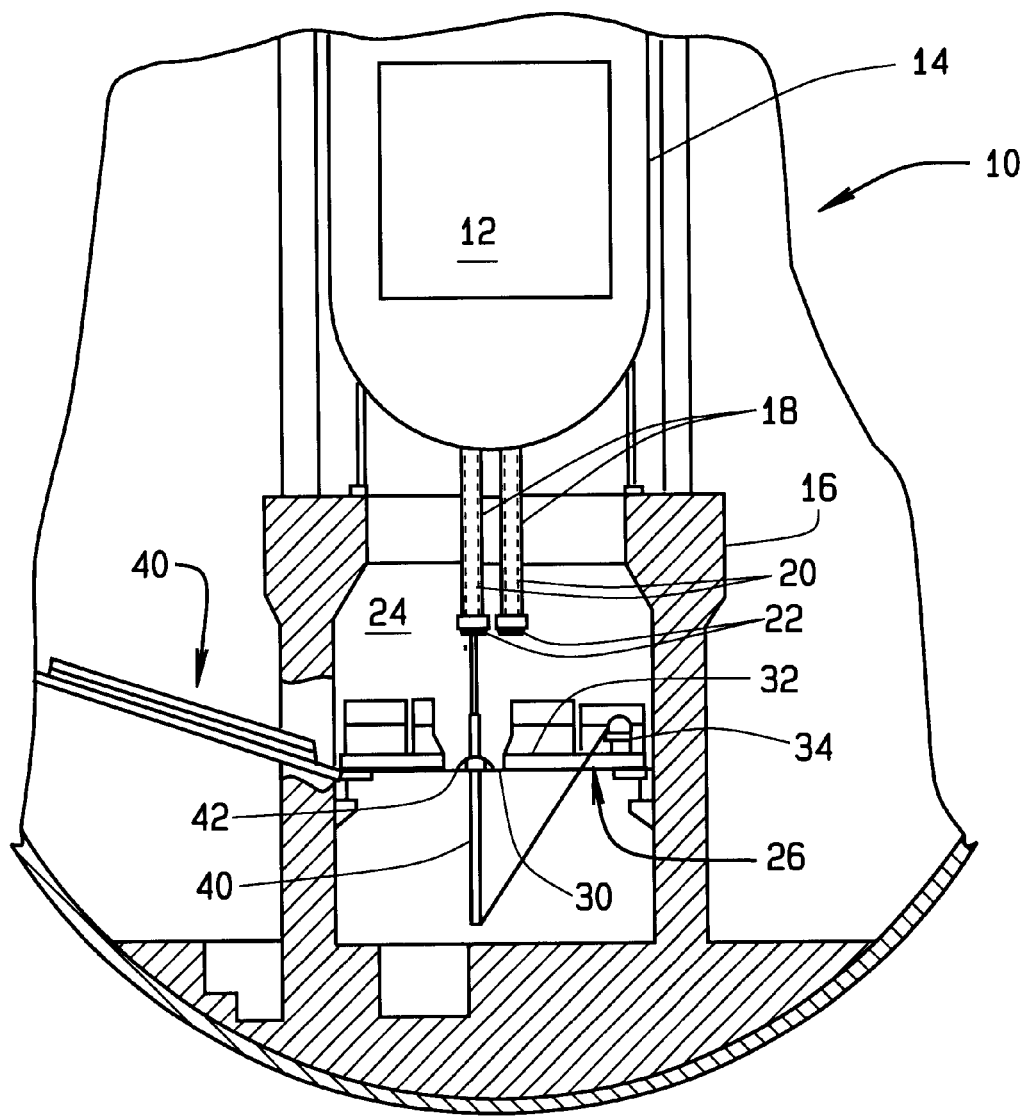
FIG. 1 is a partial cross section view, with parts cut away, of a nuclear reactor.

FIG. 1 is a cross section view of a boiling water nuclear reactor 10 including a reactor core 12 positioned within a reactor pressure vessel 14. Reactor pressure vessel 14 is supported by a reactor pressure vessel support structure 16. A plurality of control rod drive housings 18 containing control rod drives (CRDs) 20 extend from reactor pressure vessel 14. Each CRD 20 includes a CRD flange tail section 22. A control rod drive equipment platform 26 is located below reactor pressure vessel 14 an under vessel area 24. CRD equipment platform 26 includes two rails 30 and 32. A winch cart 34 is located on uppermost rail 32. A CRD handling assembly 40 is shown in a vertical handling mode and includes a trunnion cart 42 configured to ride on lower rail 30. Another CRD handling assembly 40 is shown in a shown in a horizontal transport mode.

Figure 2:
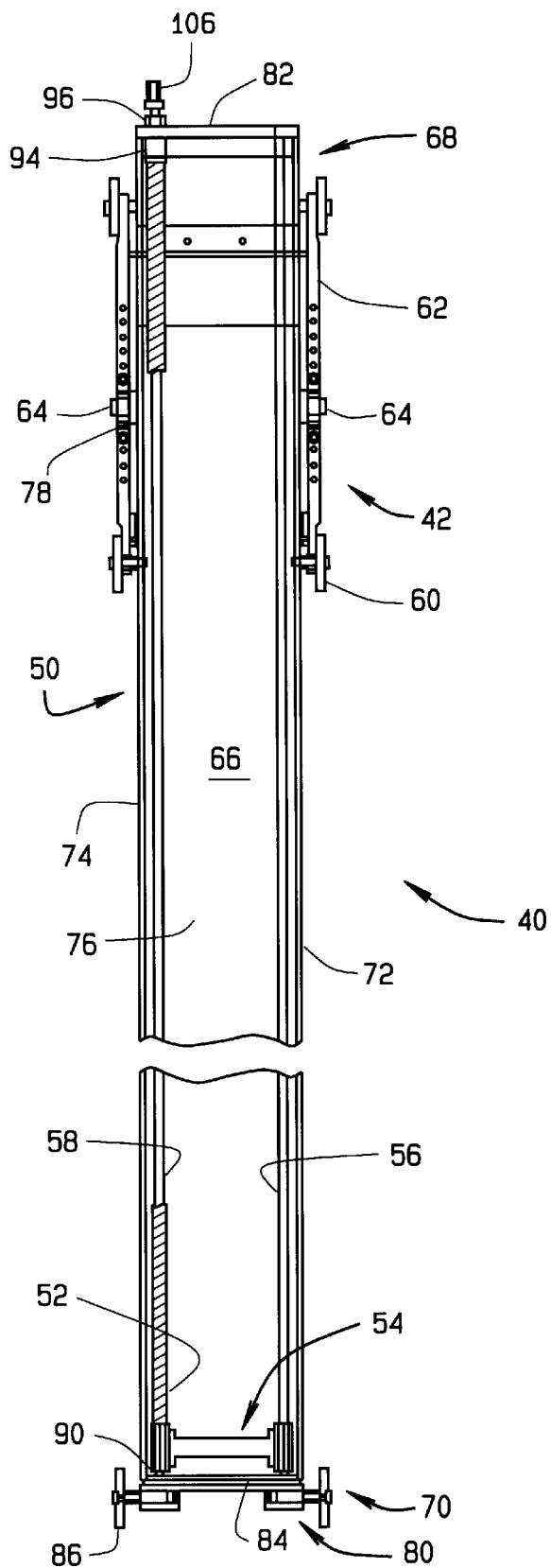
FIG. 2 is a side view of a CRD handling assembly shown in FIG. 1.

FIG. 2 is a side view of CRD handling assembly 40. In addition to trunnion cart 42, each CRD handling assembly 40 includes a tower 50 coupled to trunnion cart 42, a drive screw 52 coupled to tower 50, an elevator 54 movably engaged with drive screw 52, and a pair of linear slide rails 56 and 58 mounted to tower 50.

Trunnion cart 42 includes a plurality of cart wheels 60, a support frame 62 extending between cart wheels 60, and a pair of trunnion axles 64 coupled to support frame 62. In the exemplary embodiment, trunnion cart 42 includes four cart wheels 60. Trunnion cart 42 supports tower 50 on trunnion axles 64 and facilitates pivoting tower 50 between the horizontal transport mode and the vertical handling mode. Trunnion cart 42 also facilitates movement of CRD handling assembly 40 when in the horizontal transport mode.

Tower 50 includes an open cavity 66, a first end 68, a second end 70, a first side 72, a second side 74, and a tower back 76. A pair of pillow blocks 78 are mounted to first side 72 and second side 74. Pillow blocks 78 receive trunnion axles 64 and pivotally coupled tower 50 to trunnion cart 42. More specifically, tower 50 is pivotable on pillow blocks 78 about trunnion cart axles 64 between the horizontal transport mode and the vertical handling mode.

Tower 50 includes a wheel assembly 80, a first tie plate 82 and a second tie plate 84. Wheel assembly 80 is spaced from pillow blocks 78, located generally adjacent tower second end 70. Wheel assembly 80 includes at least one cam-out wheel 86, which is retractable to facilitate operation of CRD handling assembly 40. In the exemplary embodiment, two cam-out wheels 86 are provided for stability and are shown in an extended position. Cam-out wheels 86 are generally aligned with trunnion cart wheels 60 to facilitate operation on rail 30 (shown in FIG. 1). Wheel assembly 80 is secured to second tie plate 84.

Figure 4:
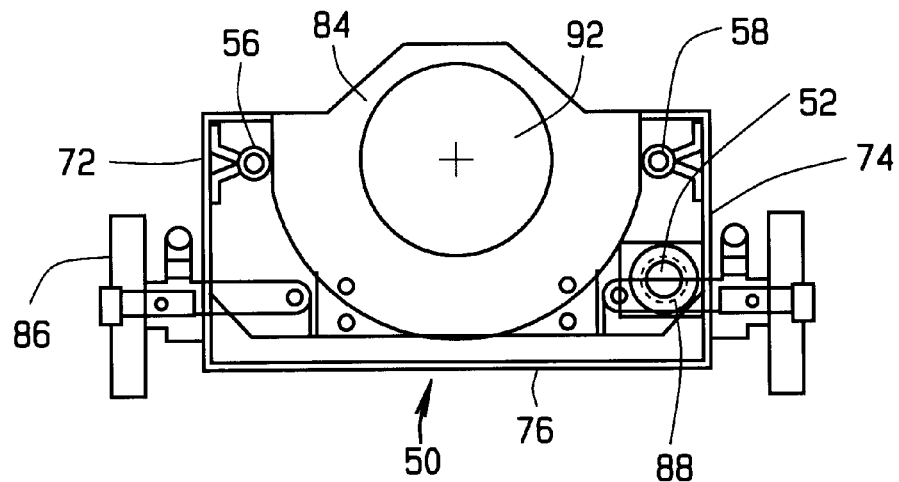
FIG. 4 is an enlarged, schematic, end view of a second tie plate shown in FIG. 2.
Figure 3:
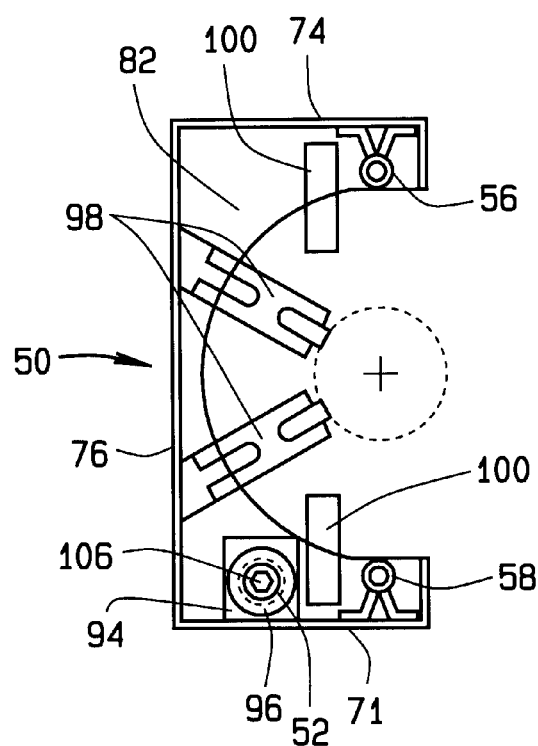
FIG. 3 is an enlarged, schematic, end view of a first tie plate shown in FIG. 2.

FIG. 3 is an enlarged, schematic, end view of first tie plate 82 and FIG. 4 is an enlarged, schematic, end view of second tie plate 84. Referring to FIGS. 2, 3, and 4, first tie plate 82 is located generally adjacent first end 68 while second tie plate 84 is located generally adjacent second end 70. Second tie plate 84 includes a drive screw bearing 88 and a CRD bore 92. Drive screw bearing 88 facilitates rotation of drive screw 52, while supporting drive screw 52. CRD bore 92 allows CRD flange tail section to extend through second tie plate 84.

First tie plate 82 includes a drive screw bearing 94, a thrust bearing 96, and at least one CRD support roller 98. Drive screw bearing 94 and thrust bearing 96 drive screw 52 adjacent tower first end 68. Thrust bearing 96 limits linear motion of drive screw 52 relative to first tie plate 82. Each CRD support roller 98 extends from first tie plate 82 to support CRD 20 when CRD handling assembly 40 is in the horizontal transport mode. In the exemplary embodiment two retractable CRD support rollers 98 extend from first tie plate 82. First tie plate 82 also includes a load transfer device 100.

Drive screw 52 is threaded and extends from second tie plate 84 to first tie plate 82. In the exemplary embodiment, drive screw 52 includes a drive operator 106 that extends from drive screw 52 through first tie plate 82. Drive operator 106 facilitates the rotation of drive screw 52 using a hand held wrench or portable powered drive tool 108 (shown in FIGS. 8 and 9).

Figure 5:
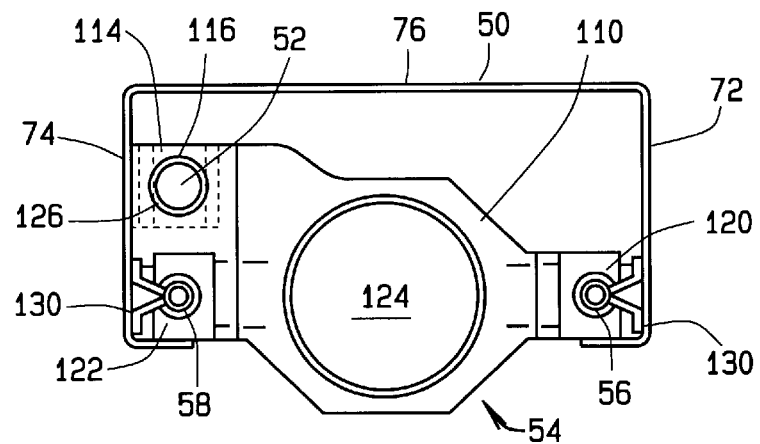
FIG. 5 is a cross section view of an elevator shown in FIG. 2.
Figure 6:
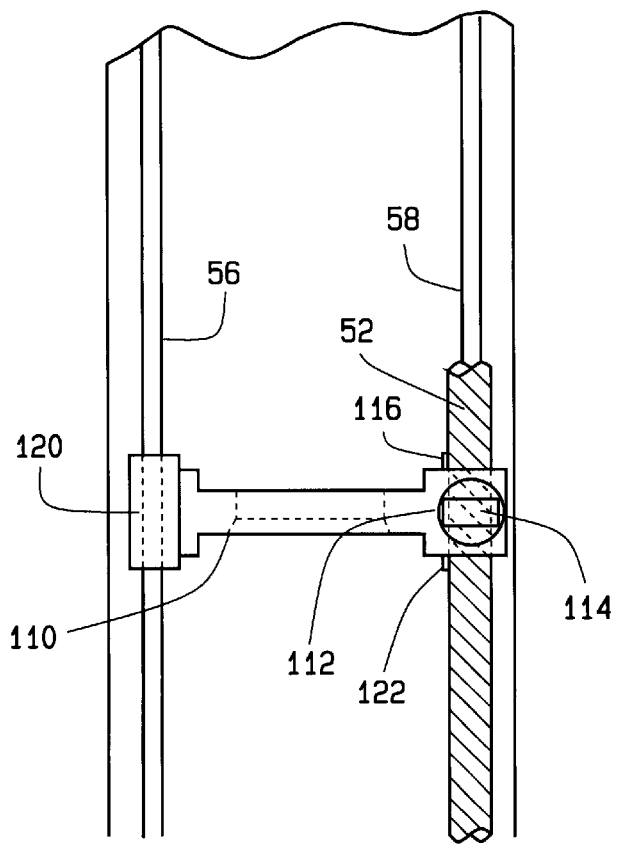
FIG. 6 is an edge view of an elevator shown in FIG. 5.

FIG. 5 is a cross section view and FIG. 6 is an edge view of elevator 54. Referring to FIGS. 2, 5 and 6, elevator 54 includes an elevator plate 110, an elevator nut recess 112, an elevator nut 114, a drive screw bore 116 extending through elevator plate 110, and linear bearing 120 and 122. In another embodiment, one linear bearing 120 extends from elevator 54. Elevator 54 extends substantially across tower open cavity 66 from linear slide rail 56 to linear slide rail 58. Elevator plate 110 includes a CRD tail bore 124, sized to receive and support CRD flange tail section 22 (shown in FIG. 8). More specifically, elevator 54 is configured to have CRD 20, including a CRD flange tail section 22, partially inserted through CRD tail bore 124.

Elevator nut recess 112 is sized to receive elevator nut 114. In the exemplary embodiment, elevator nut recess 112 is machined into elevator plate 110 and presents a cylindrical cross-section. Drive screw bore 116 intersects elevator nut recess 112 and is sized to allow drive screw 52 to extend through elevator 54.

Elevator nut 114 includes a threaded nut bore 126 sized to threadedly engage drive screw 52. When elevator nut 114 is positioned in elevator nut recess 112 and engaged with drive screw 52, elevator nut 114 is restrained from rotating by contact with elevator plate 110. Additionally, elevator nut 114 is retained in elevator nut recess 112. Rotation of drive screw 52 while threadedly engaged elevator nut 114 is in elevator nut recess 112 results in linear movement of elevator nut 114. Because elevator nut 114 is in contact with elevator plate 110, linear movement of elevator nut 114 results in linear movement of elevator 54. More specifically, as drive screw 52 rotates, elevator 54 moves up or down, depending on the direction of rotation of drive screw 52. Drive screw 52 rotation is translated by elevator nut 114, elevator plate 110, and elevator nut recess 112 into linear motion of elevator 54.

Linear bearings 120 and 122 extend from elevator plate 110 to slidably engage linear rails 56 and 58 respectively. Linear bearings 120 and 122 align elevator plate 110, maintaining elevator 54 substantially perpendicular relative to linear rails 56 and 58. Linear rails 56 and 58 are substantially cylindrical with support struts 130 coupling linear rails to tower 50. More specifically, support struts 130 secure linear rails 56 and 58 to tower first side 72 and tower second side 74. In one embodiment, support struts 130 present a V-shaped cross-section in securing linear rails 56 and 58 to tower sides 72 and 74. In one embodiment, linear rails 56 and 58 are rectangular in cross-section, engaging rectangular linear slide bearings 120 and 122. In another embodiment, linear rails 56 and 58 present a dovetail cross-section, received in a dovetail slot in linear slide bearings 120 and 122.

Figure 7:
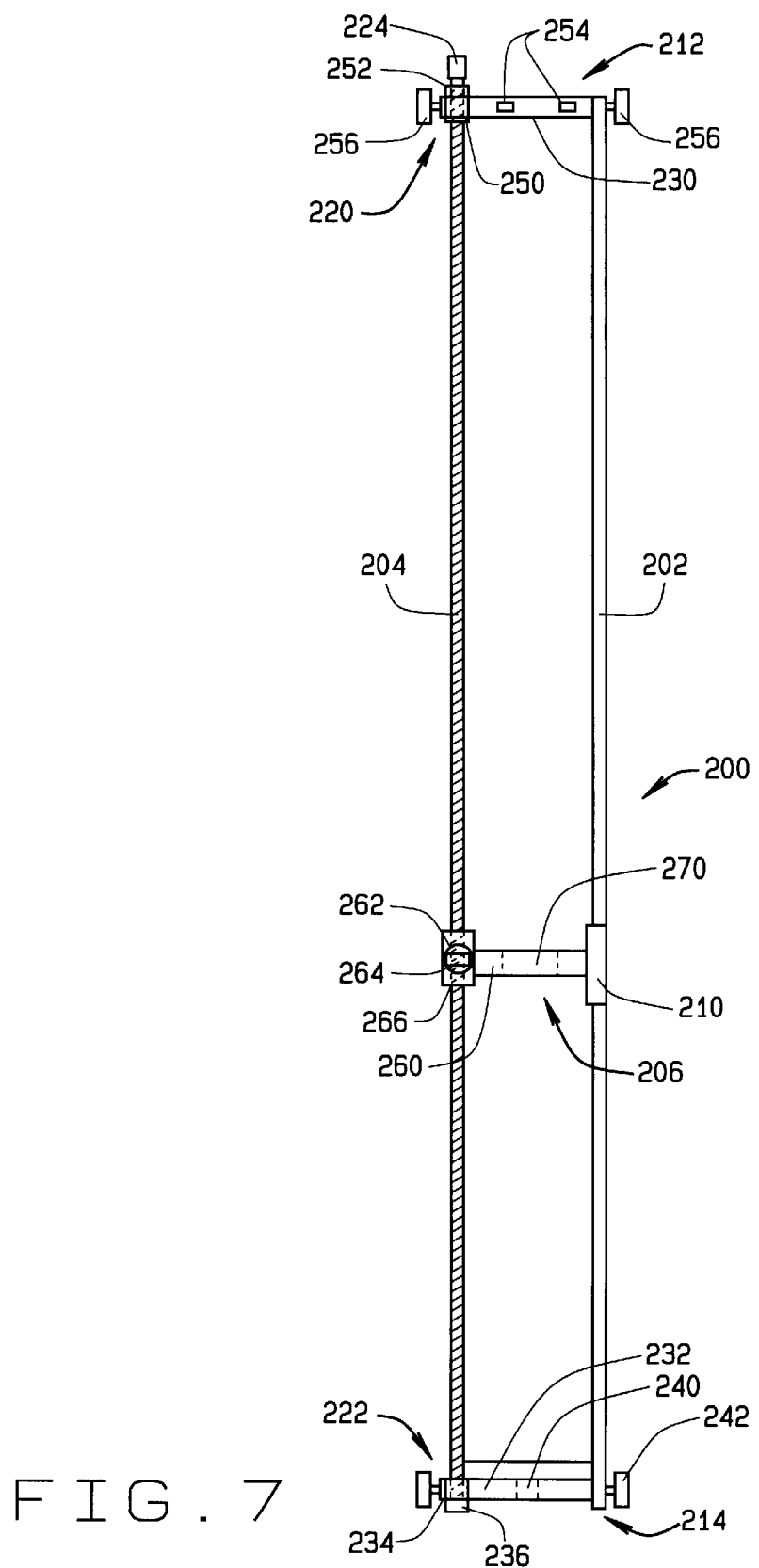
FIG. 7 is a side view of a CRD positioning apparatus.

FIG. 7 is a side view of a CRD positioning apparatus 200 in accordance with another embodiment of the present invention. CRD positioning apparatus 200 also facilitates handling of CRD 20 in nuclear reactor 10. CRD positioning apparatus 200 includes at least one linear slide rail 202, a drive screw 204 coupled to slide rail 202, an elevator 206 movably coupled to drive screw 204, and at least one linear bearing 210 fixed to elevator 206 and slidably engaged with slide rail 202. Linear slide rail 202 and drive screw 204 are substantially parallel.

Linear side rail 202 includes a first end 212 and a second end 214. In one embodiment, linear side rail 202 presents a generally circular cross-section. In another embodiment linear slide rail 202 presents a dovetail cross-section, a rectangular cross-section or other similar cross-section.

Drive screw 204 is threaded and includes a first end 220 and a second end 222. First end 220 includes a drive operator 224 to rotate drive screw 204.

A first tie plate 230 is coupled to linear side rail first end 212 and drive screw first end 220, and a second tie plate 232 is coupled to linear side rail second end 214 and drive screw second end 222. Second tie plate 232 includes a drive screw bearing 234, a drive screw thrust bearing 236, a CRD bore 240 and a pair of wheels 242. Second tie plate drive screw bearing 234 and thrust bearing 236 facilitate rotation of drive screw 204 while coupling drive screw 204 to second tie plate 232. Drive screw 204 and linear side rail 202 are thus coupled at their respective second ends 222 and 214. CRD bore 240 allows CRD flange tail section 22 to extend through second tie plate 232.

CRD positioning apparatus first tie plate 230 includes a drive screw bearing 250, a thrust bearing 252, at least one CRD support roller 254 and a pair of wheels 256. Drive screw bearing 250 and thrust bearing 252 support drive screw 204 at first end 220. Thrust bearing 252 limits linear motion of drive screw 204 relative to first tie plate 230. CRD support rollers 254 extend from first tie plate 230 to support CRD 20 when CRD positioning apparatus 200 is in the horizontal transport mode. Wheels 256 facilitate the transportation of CRD positioning apparatus 200. First tie plate 230 couples drive screw 204 and linear slide rail 202 at their respective first ends 220 and 212 to provide a structurally stable positioning apparatus 200.

Elevator 206 includes an elevator plate 260, an elevator nut recess 262, an elevator nut 264, and a drive screw bore 266 extending through elevator plate 260. Elevator plate 260 includes a CRD tail bore 270 sized to receive and support CRD flange tail section 22. Elevator nut recess 262 is sized to receive elevator nut 264. In one embodiment, elevator nut recess 262 is machined into elevator plate 260 and presents a cylindrical cross-section. Drive screw bore 266 intersects elevator nut recess 262 and is sized to allow drive screw 204 to extend through elevator 206.

Elevator nut 264 threadedly engages drive screw 204. When elevator nut 264 is positioned in elevator nut recess 262 and engaged with drive screw 204, elevator nut 264 is restrained from rotating by contact with elevator plate 260. Additionally, elevator nut 264 is retained in elevator nut recess 262. Rotation of drive screw 204 while threadedly engaged elevator nut 264 is in elevator nut recess 262 results in linear movement of elevator nut 264. Because elevator nut 264 is in contact with elevator plate 260, linear movement of elevator nut 264 results in linear movement of elevator 206. More specifically, as drive screw 204 rotates, elevator 206 moves up or down, depending on the direction of rotation of drive screw 204.

Linear bearing 210 is secured to elevator 206 and extends to engage linear slide rail 202. More specifically, linear slide rail 202 is slidably retained within linear bearing 210. Linear bearing 210 aligns elevator 206 substantially perpendicular to linear bearing 210, and maintains that alignment as elevator 206 is repositioned by rotation of drive screw 204.

Figure 8:
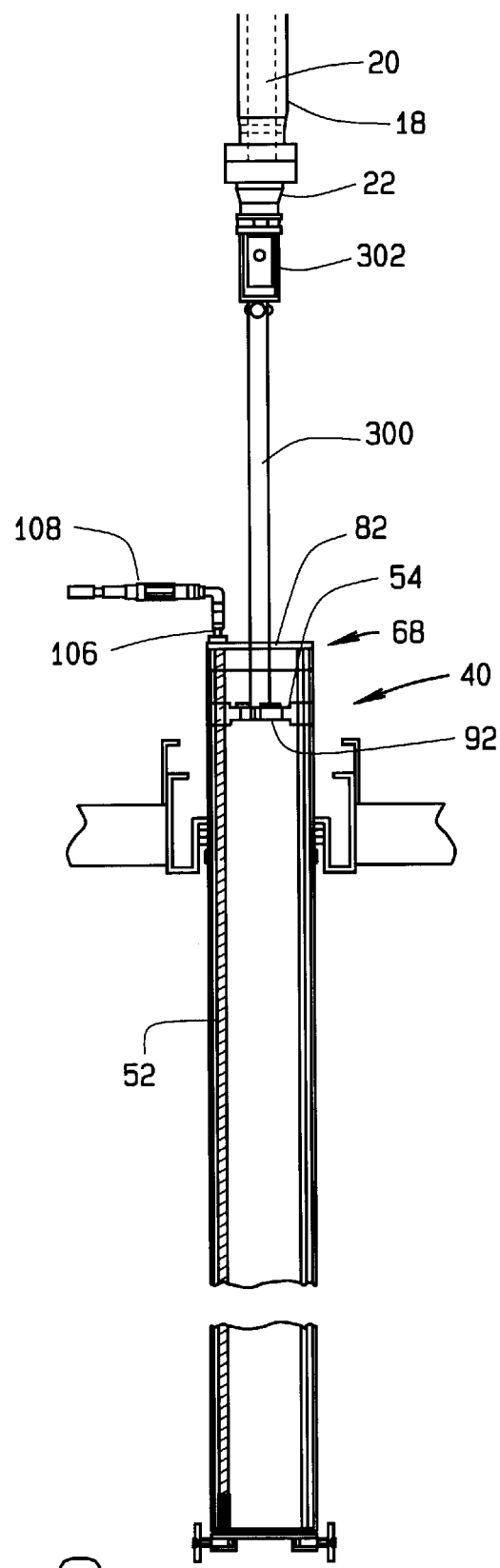
FIG. 8 is a side view of the CRD handling assembly shown in FIGS. 1 and 2 receiving the CRD.
Figure 9:
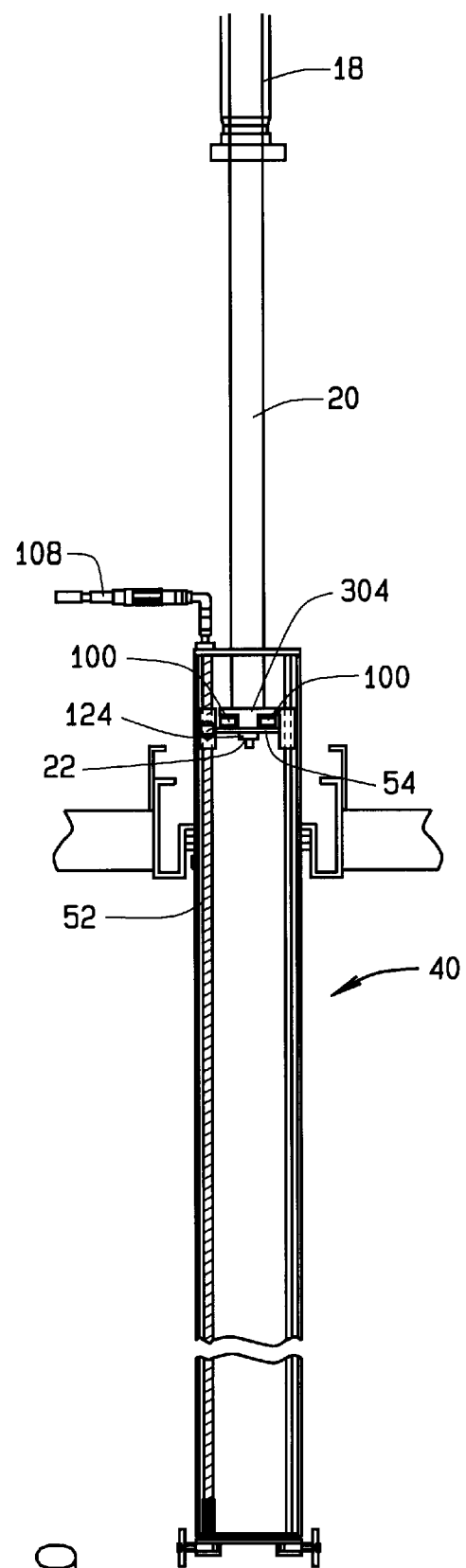
FIG. 9 is a side view of the CRD handling assembly, shown in FIGS. 1 and 2, handling the CRD.

In use, CRD handling assembly 40 and CRD positioning apparatus 200 perform in similar fashion. FIGS. 8 and 9 are side views of CRD handling assembly 40 shown receiving CRD 20. Referring to FIG. 8, CRD handling assembly 40 is aligned with CRD 20 in a vertical handling mode. An extension tube 300 is seated in elevator CRD bore 92. Portable powered drive tool 108 is coupled to drive operator 106 and operated to rotate drive screw 52, moving elevator 54 to a position adjacent tower first end 68 so extension tube 300 engages CRD flange tail section 22. Particularly, an extension tube receiver cup 302 receives CRD tail section 22. CRD 20 is then disconnected from CRD housing 18. CRD 20 is supported by elevator 54 through extension tube 300. Linear bearings 120 and 122 extend from elevator plate 110 to engage linear rails 56 and 58 and align elevator 54 substantially perpendicular to linear rails 56 and 58, supporting CRD 20. Drive screw 52 is operated to lower elevator 54 until CRD flange tail section 22 is adjacent first tie plate 82.

Referring to FIG. 9, load transfer device 100 engages CRD flange 304 to support CRD 20. Elevator 54 is lowered to disengage extension tube 300 (shown in FIG. 8) from CRD flange tail section 22 and then raised to receive CRD flange tail section 22 in CRD tail bore 124 and support CRD 20. Load transfer device 100 is disengaged and drive screw 52 rotated to lower elevator 54 and CRD 20. When CRD 20 has been lowered sufficiently CRD handling assembly 40 is pivoted to the horizontal transport mode and CRD 20 and CRD handling assembly 40 are transported from under vessel area 24 as required.

Handling assembly 40 and positioning apparatus 200 facilitate removal and installation of CRD 20 from CRD housing 18 under reactor pressure vessel 14. Handling assembly 40 and positioning apparatus 200 include a reduced number of components, facilitating a reduction in contaminated material. Furthermore, handling assembly 40 can improve reliability and reduce maintenance time, as compared to conventional CRD handling equipment, with an overall reduction in maintenance cost and reduced outage time.

While the invention has been described in terms of various specific embodiments, those skilled in the art will recognize that the invention can be practiced with modification within the spirit and scope of the claims.

What is claimed is:

1. A positioning apparatus for a control rod drive (CRD) handling assembly for a nuclear reactor, said positioning apparatus comprising:
   at least one linear slide rail;
   a drive screw coupled to said at least one slide rail;
   an elevator movably coupled to said drive screw, said elevator comprising a bore extending therethrough sized to receive and support a control rod drive; and
   at least one linear bearing attached to said elevator and slidably engaged with said at least one slide rail.

2. A positioning apparatus in accordance with claim 1 comprising a first and a second linear slide rail, said drive screw coupled to both linear slide rails, said elevator comprising a first and a second linear bearing, said first linear bearing slidably engaged with said first linear slide rail and said second linear bearing slidably engaged with said second linear slide rail.

3. A positioning apparatus in accordance with claim 2 wherein said drive screw is coupled to a first end of said linear slide rails by a first tie plate and to a second end of said linear slide rails by a second tie plate.

4. A positioning apparatus in accordance with claim 3 wherein said first tie plate comprises a first drive screw bearing and a drive screw thrust bearing to rotatably support said drive screw.

5. A positioning apparatus in accordance with claim 3 wherein said second tie plate comprises a drive screw bearing to rotatably support said drive screw.

6. A positioning apparatus in accordance with claim 3 wherein said first tie plate comprises a plurality of CRD support rollers.

7. A positioning apparatus in accordance with claim 1 wherein said elevator comprises a elevator nut received in an elevator nut recess, said elevator nut configured to engage said drive screw.

8. A positioning apparatus in accordance with claim 7 wherein said elevator nut is retained in said elevator nut recess by said drive screw.

9. A handling assembly for a CRD for a nuclear reactor, said handling assembly comprising:
   a trunnion cart;
   a tower coupled to said trunnion cart;
   a drive screw coupled to said tower;
   an elevator movably coupled to said drive screw, said elevator comprising a bore extending therethrough sized to receive and support a control rod drive; and
   at least one slide rail coupled to said tower, said at least one slide rail aligning said elevator, said elevator further comprising at least one linear bearing slidably engaged with said at least one slide rail.

10. A handling assembly in accordance with claim 9 wherein said trunnion cart comprises a plurality of wheels, a plurality of trunnion axles, said trunnion axles pivotally coupling said tower to said trunnion cart.

11. A handling assembly in accordance with claim 10 wherein said tower comprises a plurality of pillow blocks secured to said tower, said pillow blocks pivotally coupling said tower to said trunnion cart axles.

12. A handling assembly in accordance with claim 9 wherein said tower comprises a wheel assembly spaced from said trunnion cart.

13. A handling assembly in accordance with claim 12 wherein said wheel assembly includes at least one wheel, each said wheel pivotable from a retracted position to an extended position.

14. A handling assembly in accordance with claim 9 wherein said tower comprises a first tie plate and a second tie plate.

15. A handling assembly in accordance with claim 14 wherein said first tie plate comprises a first drive screw bearing and a drive screw thrust bearing to rotatably support said drive screw.

16. A handling assembly in accordance with claim 14 wherein said second tie plate comprises a second drive screw bearing to rotatably support said drive screw.

17. A handling assembly in accordance with claim 9 wherein said tower comprises a plurality of CRD support rollers.

18. A handling assembly in accordance with claim 9 wherein said elevator comprises a elevator nut received in an elevator nut recess, said elevator nut configured to engage said drive screw.

19. A handling assembly in accordance with claim 18 wherein said elevator nut is retained in said elevator nut recess by said drive screw.

20. A handling assembly for a CRD for a nuclear reactor, said handling assembly comprising:

a trunnion cart comprising a plurality of trunnion axles;

a tower pivotally coupled to said trunnion cart, said tower sized to receive a CRD, said tower comprising a wheel assembly, a first tie plate, a second tie plate, a lower drive screw bearing, an upper drive screw bearing, and a drive screw thrust bearing;

a threaded drive screw rotatably coupled to said tower by said lower drive screw bearing, said upper drive screw bearing, and said drive screw thrust bearing, said drive screw including a drive screw operator;

an elevator comprising a plurality of linear bearings, a CRD support plate, a nut recess, and a elevator nut received in said nut recess, said elevator nut threadedly engaged with said drive screw; said drive screw retaining said elevator nut in said nut recess, said CRD support plate comprising a bore extending therethrough sized to receive and support a control rod drive; and a plurality of linear slide rails coupled to said tower, each said slide rail slidably engaged to one of said elevator linear bearings, said linear slide rails aligning said elevator.

* * * * *